United States Patent
Guo et al.

(10) Patent No.: US 11,775,475 B2
(45) Date of Patent: Oct. 3, 2023

(54) DEFERRED PATH RESOLUTION DURING CONTAINER DEPLOYMENT

(71) Applicant: Microsoft Technology Licensing, LLC, Redmond, WA (US)

(72) Inventors: Amber Tianqi Guo, Bellevue, WA (US); Benjamin M. Schultz, Bellevue, WA (US); Frederick Justus Smith, IV, Redmond, WA (US); Axel Rietschin, Sammamish, WA (US); Hari R. Pulapaka, Redmond, WA (US); Mehmet Iyigun, Kirkland, WA (US); Jonathan De Marco, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/293,456

(22) Filed: Mar. 5, 2019

(65) Prior Publication Data

US 2020/0285609 A1  Sep. 10, 2020

(51) Int. Cl.
*G06F 16/11* (2019.01)
*G06F 16/13* (2019.01)
*G06F 16/188* (2019.01)
*G06F 16/901* (2019.01)

(52) U.S. Cl.
CPC ............ *G06F 16/128* (2019.01); *G06F 16/13* (2019.01); *G06F 16/188* (2019.01); *G06F 16/9017* (2019.01)

(58) Field of Classification Search
CPC .. G06F 16/128; G06F 16/188; G06F 16/9017; G06F 16/13; G06F 16/00; G06F 12/00; G06F 7/00; G06F 2200/00; G06K 9/6288; G06K 9/32
See application file for complete search history.

(56) References Cited

U.S. PATENT DOCUMENTS

| | | | |
|---|---|---|---|
| 5,832,527 A * | 11/1998 | Kawaguchi | G06F 16/10 |
| 7,340,444 B2 | 3/2008 | Hipp | |
| 8,145,673 B2 | 3/2012 | Bloesch et al. | |
| 9,747,168 B2 | 8/2017 | Haustein et al. | |
| 9,819,570 B2 * | 11/2017 | Abe | H04L 45/02 |
| 9,898,354 B2 | 2/2018 | Engel et al. | |

(Continued)

OTHER PUBLICATIONS

Yuri Boykov; Interactive Graph Cuts for Optimal Boundary & Region Segmentation of Objects in N-D Images; 2001;IEEE; pp. 105-112 (Year: 2001).*

(Continued)

*Primary Examiner* — Albert M Phillips, III
*Assistant Examiner* — Jermaine A Mincey (57) ABSTRACT

Techniques of deferred container deployment are disclosed herein. In one embodiment, a method includes receiving, at a computing device, a container image corresponding to the container. The container image includes a first set of files identified by symbolic links individually directed to a file in the host filesystem on the computing device and a second set of files identified by hard links. The method also includes in response to receiving the container image, at the computing device, storing the received container image in a folder of the host filesystem on the computing device without resolving the symbolic links of the first set of the files until runtime of the requested container.

20 Claims, 8 Drawing Sheets

(56) References Cited

U.S. PATENT DOCUMENTS

| | | | |
|---|---|---|---|
| 10,146,793 B2 | 12/2018 | Srivas et al. | |
| 10,855,725 B2 | 12/2020 | Pai et al. | |
| 10,938,619 B2* | 3/2021 | Rachamadugu | G06F 9/455 |
| 11,126,740 B2 | 9/2021 | Havewala et al. | |
| 2006/0117049 A1* | 6/2006 | Jain | G06F 16/13 |
| 2009/0271412 A1* | 10/2009 | Lacapra | G06F 3/067 |
| 2010/0026470 A1* | 2/2010 | Wilson | G06K 9/6288 |
| | | | 340/10.52 |
| 2011/0264718 A1* | 10/2011 | Chen | G06F 21/53 |
| | | | 707/831 |
| 2013/0167118 A1* | 6/2013 | Borgianni | G06F 16/955 |
| | | | 717/121 |
| 2014/0201177 A1* | 7/2014 | Suryanarayan | G06F 16/182 |
| | | | 707/705 |
| 2015/0205674 A1* | 7/2015 | Schroth | G06F 11/1458 |
| | | | 707/649 |
| 2017/0083541 A1* | 3/2017 | Mann | G06F 16/119 |
| 2018/0129666 A1* | 5/2018 | Havewala | G06F 16/188 |
| 2019/0235897 A1* | 8/2019 | Goel | G06F 9/45545 |
| 2021/0042141 A1 | 2/2021 | De Marco et al. | |

OTHER PUBLICATIONS

"International Search Report and Written Opinion issued in PCT Patent Application No. PCT/US20/019776", dated Jun. 12, 2020, 15 Pages.

Yassin, et al., "On-Demand Host-Container Filesystem Sharing", Retrieved From: https://noamshalev.github.io/downloads/Project-DockerDynamicVolume.pdf, Dec. 31, 2016, 34 Pages.

"Non Final Office Action Issued in U.S. Appl. No. 16/597,657", dated Dec. 23, 2021, 22 Pages.

"International Search Report and Written Opinion Issued in PCT Application No. PCT/US20/036877", dated Sep. 22, 2020, 11 Pages.

"Final Office Action Issued in U.S. Appl. No. 16/597,657", dated Apr. 12, 2022, 21 Pages.

"Office Action Issued in European Patent Application No. 20713789.4", dated Mar. 1, 2023, 5 Pages.

\* cited by examiner

DEFERRED PATH RESOLUTION DURING CONTAINER DEPLOYMENT

BACKGROUND

Sandboxing is a software management strategy that isolates operating systems and/or applications from computing resources of a host device and other programs on the same host device. For example, data centers providing cloud computing services can include a large number of servers individually hosting one or more virtual machines, containers, or other types of virtualized components. The virtual machines and containers can be used to execute applications for tenants without giving direct access to the underlying computing resources of the severs. Sandboxing can thus provide a layer of isolation and/or security that prevents malware or harmful applications from negatively affecting host devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though both virtual machines and containers can be used as virtualization techniques to accommodate compute, communications, or other types of computing services, virtual machines and containers have different characteristics. For instance, virtual machines can incur a significantly more overhead in resources than containers. A virtual machine typically has an entire operating system, a full set of files and directory structures, a unique configuration, virtual memory allocation, and applications, all of which can amount to tens of gigabytes in size. In contrast, containers (e.g., Docker-based containers) are software packages that provide facilities a software application or service needs to run, such as code, runtime, tools, system libraries, etc. Containers can share resources of a host device, such as an operating system kernel, device drivers, etc. Thus, containers typically have a much lower memory and image footprints than virtual machines (e.g. megabytes instead of gigabytes in size).

Software packages of containers, or container images, can include digital data representing a complete filesystem (e.g., organized as a file folder with subordinate file folders) that contains operating system kernels, device drivers, event logs, temporary files/directories, applications, and/or other suitable components. Container images typically have sizes of about a few hundred megabytes. In datacenters or other computing environments with abundant computing/network resources, deploying such container images generally would not cause undue delays. However, in other computing environments with scarce computing/network resources (e.g., smartphones, IoT devices, etc.), deploying a container image of a few hundred megabytes may cause unacceptable delays and/or incur substantial data costs. For instance, transmitting a few hundred megabytes of data via a slow data network (e.g., a satellite data network) can take up significant amounts of time.

One technique to reduce data sizes of container images includes dynamically generating a container image during deployment time based on a recipe file included in the container images in addition to files unique to a container. The recipe file can identify software components, such as, kernel modules, device drivers, applications, etc. that are available from a host operating system at the host device. During deployment, a container engine on the host device can dynamically generate a full container image having the files unique to the container and additional files generated according to the recipe file. The additional files can be generated, for example, by copying the identified components from the host operating system or creating hard links to the identified components of the host operating system. As such, the sizes of the container images transmitted for deployment can be further reduced, for example, from a few hundred megabytes to a few tens of megabytes.

The foregoing dynamical generation technique, however, may also cause unacceptable delays under certain circumstances. For example, during deployment, copying or creating hard links to components of the host operating system according to the recipe file can overload input/output capacities of a storage device (e.g., a hard disk drive) on the host device. As such, for a period of time (e.g., about one to five minutes with certain hardware types), the storage device may not be available for any other processes and/or applications on the same host device. Such delays can interrupt execution of other applications on the host device, reduce performance of the host device, and thus negatively impact user experience. In some scenarios, multiple containers can have different images being executed on the same host. Updating multiple container images can cause even more delays.

Several embodiments of the disclosed technology can address certain aspects of the foregoing drawback by implementing deferred path resolution of certain components in container images during deployment. In certain implementations, instead of having a recipe file that identifies various components from the host operating system and creating hard links to these components during deployment according to the recipe file, the container image can include a file system (e.g., formatted as a virtual hard disk or "VHD," or according to any other suitable disk image techniques/standards) that has multiple symbolic links (or "soft links") to the same components from the host operating system. In one example, the symbolic links can each be identified by a file path that includes a parent identifier and a relative path concatenated to the parent identifier. For instance, a symbolic link to file "ntdll.dll" can include the following:

GUID\system32\ntdll.dll in which the parent identifier includes a "GUID" containing a globally unique identifier that corresponds to a file, directory, and/or drive on the host device. The relative path in the above example is "\system32\ntdll.dll," which is concatenated to "GUID." One example GUID for a windows folder on the host device can be the following:

{F38BF404-1D43-42F2-9305-67DE0B28FC23}

Even though a GUID is used as an example for the parent identifier, in other implementations, the parent identifier can also include other suitable types of data.

In accordance with embodiments of the disclosed technology, resolution of the parent identifiers of the symbolic links can be deferred to runtime of the container instead of during deployment of the container. During deployment, the file system of the container can be copied to or otherwise made available to the host device by, for instance, mounting on the host device the VHD containing the symbolic links and other files unique to the container. As such, files unique to the container and symbolic links of the container image in the VHD can be accessed as a drive and/or folder on the host device.

During runtime, when a file of the container (e.g., "ntdll.dll") is to be accessed, for instance, by a container process, a file manager on the host device can resolve the parent identifier, generate a complete file path for the file, and access the file at the complete file path, and serve the file to the container process. For instance, in the example above, the "GUID" of "ntdll.dll" can include a string that corresponds to a system directory/drive on the host device (e.g., "C:\windows") as indicated in a path table maintained on the host device. As such, upon parsing the symbolic link above, the file manager can locate a path to the system directory on the host device by consulting the path table and construct a complete file path to the requested file as following:

C:\windows\system32\ntdll.dll

The file manager can then access the file "ntdll.dll" at the constructed file path and serve the file to the container process. As such, files of the container can be served to the container process during runtime on an as-needed basis without being all fully resolved at one time during deployment.

Without being bound by theory, it has been recognized that even though a container image can include thousands of files, only a small portion of these files are accessed at one time during runtime. In other words, not all or even a majority of the files are needed concurrently during runtime. As such, by deferring path resolution of these files, i.e., not resolving the symbolic links of the files during deployment, significant amount of computing resources for resolving these symbolic links at the host device can be saved. In addition, by not resolving the symbolic links during deployment, an amount of time for instantiation of the container can also be reduced when compared to copying or establishing hard links to the files during deployment according to the recipe file.

In accordance with additional embodiments of the disclosed technology, a container image can also be logically divided into separate container layers using symbolic links, and thus allowing individual container layers be deployed and/or updated separately. For instance, a container can include a base layer having files configured to provide filesystem facilities, and an application layer on top of the base layer. Each of the base layer and the application layer can have a corresponding parent identifier (e.g., base GUID and application GUID, respectively). Such parent identifiers of the container layers can be hard coded into the host operating system, included as a part of container layer metadata, or disseminated in other suitable manners. As such, the base layer can be deployed on the host device with symbolic links that reference the parent identifier of the host device (e.g., a host GUID). Subsequently, the application layer can be deployed on the same host device with symbolic links that reference one or both of the host GUID or the base GUID. The host, base, and application GUIDs can be resolved during runtime as described above.

The foregoing layered architecture of a container image can further reduce sizes of deployed containers on a host device. For instance, in the example above, a new container having a second application layer can also be deployed on the same host device with symbolic links referencing the deployed base layer or optionally the deployed first application layer in the existing container. As such, the image of the new container does not need to include files/directories of the base layer or the first application layer. As such, rigid interdependencies of base and application layers in conventional container packages can be avoided. Thus, the host device can have a single copy of the base and/or application layers in order to serve multiple containers referencing the base and/or application layers.

The foregoing layered architecture can also allow efficient updating of the deployed containers on the host device. For example, when an update to the base layer is available, the host device can update a single copy of the base layer without updating any application layers or the individual base layer in each of the containers. During runtime, symbolic links to the base layer can be resolved using the same base GUID as the original version of the base layer. In another example, when an update to the application layer is available, the host device can update the application layer without affecting the base layer. Such update can sometimes be implemented as hot patches during which execution of the container is not suspended or terminated.

DETAILED DESCRIPTION

Certain embodiments of systems, devices, components, modules, routines, data structures, and processes for deferred path resolution during container deployment on computing devices are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, a "host" or "host device" generally refers to a computing device that is configured to implement, for instance, one or more virtual machines, containers, or other suitable virtualized components. For example, a host can include a remote server having a hypervisor configured to support one or more virtual machines, containers, or other suitable types of virtual components. In another example, a host can also include a desktop computer, a laptop computer, a smartphone, a web-enabled appliance (e.g., a camera), or other suitable computing devices configured to implement one or more containers or other suitable types of virtual components.

Also used herein, the term "container" generally refers to a software package that contains a piece of software (e.g., an application) in a filesystem having computer codes (e.g., executable instructions), a runtime environment, system tools, system libraries, device drivers, and/or other suitable components sufficient to execute the piece of software. Containers running on a single computer or virtual machine may all share the same operating system kernel and can make use of system memory or virtual memory.

A container can have similar resource isolation and allocation benefits as virtual machines. However, a different architectural approach allows containers to be much more portable and efficient than virtual machines. For example, a virtual machine typically includes one or more applications, necessary binaries and libraries of the applications, and an entire operating system. In contrast, a container can include an application and all of its dependencies, but shares an operating system kernel with other containers on the same host. As such, containers can be more resource efficient and flexible than virtual machines. One example container is a Windows Server container by Microsoft Corporation of Redmond, Wash. Another example container is a Linux container or LXC. Docker is a popular mechanism to package and deliver containers, provided by Docker, Inc. of San Francisco, Calif.

Also used herein, a "container image" generally refers to a software package of a container deployable on a host device. A container image can include digital data representing a filesystem (e.g., organized as a file folder with subordinate file folders) that contains operating system kernels, device drivers, event logs, temporary files/directories, applications, and/or other suitable components or references thereof. In accordance with embodiments of the disclosed technology, container images can include digital data representing files unique to a container. Examples of such unique files can include event log files, temporary files, application files, etc. that are not available from the host device. The container image can also include multiple symbolic links or soft links to additional files available from the host device. Further used herein, a "container process" generally refers to an instance of a container image that is being executed by a processor of a host device. The Instance of the container typically contains program codes and associated activities of the container.

As used herein, a "symbolic link" or "soft link" generally refers to a file that contains a reference to another file, directory, or drive as an absolute or relative path. In certain implementations, a symbolic link can include a text string that is automatically interpreted and followed by an operating system as a path to another file, directory, or drive. This another file, directory, or drive is referred to commonly as a "target". The symbolic link is a file that exists independently of a corresponding target. For example, a symbolic link can include a file path that has a parent identifier to be resolved at runtime and a relative path concatenated to the parent identifier. For instance, a symbolic link to file "ntdll.dll" can include the following:

GUID\system32\ntdll.dll in which the parent identifier includes a "GUID" containing a globally unique identifier that corresponds to a file, directory, and/or drive on the host device. The relative path in the above example is "\system32\ntdll.dll," which is concatenated to "GUID." One example GUID for a windows folder on the host device can be the following:

{F38BF404-1D43-42F2-9305-67DE0B28FC23}

Even though a GUID is used as an example for the parent identifier, in other implementations, the parent identifier can also include other suitable types of data.

Also used herein, a "filesystem" generally refers to a software component configured to control how data is stored and retrieved from a storage device on a host device. Examples of the storage device can include hard disk drives, solid state devices, magnetic tapes, network drives, or other suitable persistent storage devices. Example filesystems can include file allocation table (FAT), New Technology File System (NTFS), Extents File System (XFS), etc. A user can access files in a filesystem via a "file manager" that is a computer program that provides a user interface to manage files and folders. File managers typically provide functionalities such as creating, opening (e.g. viewing, playing, editing, or printing), renaming, moving or copying, deleting, searching for files, as well as modifying file attributes, properties, and file permissions. One example file manager is Windows File Manager® provided by Microsoft Corporation of Redmond, Wash.

Further used herein, a "file path" or "path" generally refers to data that specifies a unique location of a corresponding file, directory, or drive in a filesystem. A path can include a drive, a directory, a file name, or other suitable components separated by delimiting characters, such as a slash ("/"), a backslash ("\"), or a colon (":"). An "absolute" or "full path" points to a location in a file system regardless of a current working directory. An example of a full path is "c:\windows\system32\ntdll.dll." In contrast, a "relative path" starts from a given working directory (e.g., "C:\windows\"), avoiding the need to provide a full path. An example of a relative path is "\system32\ntdll.dll," which can be concatenated to obtain a full path of "C:\windows\system32\ntdll.dll" if the working directory is "C:\windows\".

Even though container images are much smaller than virtual machine images, deploying container images in low resource computing systems may still be a challenge. One technique to further reduce data sizes of container images includes dynamically generating a container image during deployment time based on a recipe file included in the container images in addition to files unique to a container. The recipe file can identify software components, such as, kernel modules, device drivers, applications, etc. that are available from a host operating system at the host device. During deployment, a container engine on the host device can dynamically generate a full container image by copying the identified components from the host operating system or creating hard links to the identified components of the host operating system. As such, the sizes of the container images transmitted for deployment can be further reduced, for example, from a few hundred megabytes to a few tens of megabytes.

The foregoing dynamical generation technique, however, may also cause unacceptable delays under certain circumstances. For example, during deployment, copying or creating hard links to components of the host operating system according to the recipe file can overload input/output capacities of a storage device (e.g., a hard disk drive) on the host device. As such, for a period of time (e.g., about one to five minutes with certain hardware types), the storage device may not be available for any other processes and/or applications on the same host device. Such delays can interrupt execution of other applications on the host device, reduce performance of the host device, and thus negatively impact user experience. In some scenarios, multiple containers can have different images being executed on the same host. Updating multiple container images can cause even more delays.

Several embodiments of the disclosed technology can address certain aspects of the foregoing drawback by implementing deferred path resolution of certain components in container images during deployment. In accordance with aspects of the disclosed technology, a container image can be organized as a folder, VHD, or other suitable file structure that contains a first set of files unique to the container and a second set of files that are symbolic links to other files from a host operating system or other components on the host device. The symbolic links can include a parent identifier and a relative path. During deployment, the folder or VHD containing the container image can be mounted to the host device and thus deploying the container on the host device. During runtime, a file manager on the host device can resolve the symbolic links in an ad hoc manner upon receiving file requests for the corresponding files. As such, overloading input/output capacities of the storage device during deployment of the container can be avoided, as described in more detail below with reference to FIGS. 1-6.

Figure 1:
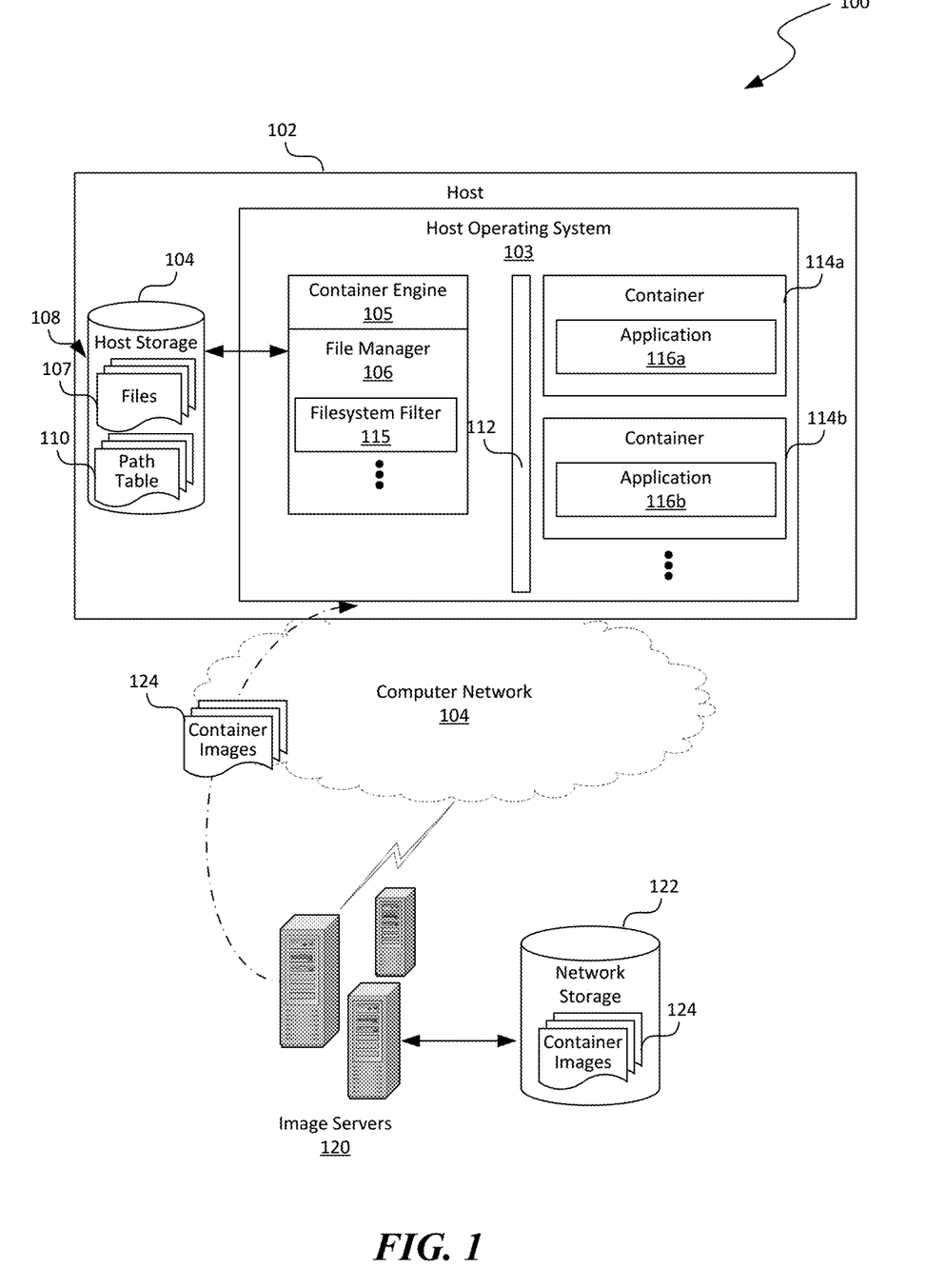
FIG. 1 is a schematic diagram of a computing system implementing deferred path resolution for containers in accordance with embodiments of the disclosed technology.

FIG. 1 is a schematic diagram illustrating a computing system 100 implementing deferred path resolution during container deployment in accordance with embodiments of the disclosed technology. In FIG. 1 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computing system 100 can include a host 102 interconnected, via a computer network 104, to one or more image servers 120 interconnected with a network storage 122 containing container images 124. The computer network 104 can include an intranet, a wide area network, an internet (e.g., the Internet), or other suitable types of network. Even though particular components of the computing system 100 are shown in FIG. 1, in other embodiments, the computing system 100 can also include additional and/or different components or arrangements. For example, in certain embodiments, the computing system 100 can also include additional hosts, servers, networks, and/or other suitable components (not shown). In other embodiments, the image servers 120 may be omitted. Instead, container images 124 may be provided to the host 102 via removable storage devices (e.g., flash drives, external hard disk drives, etc.), or in other suitable manners.

The image servers 120 can include one or more remote servers or other suitable types of computing devices that are configured to generate, organize, and provide the container images 124 from the network storage 122 to the host 102 or to other suitable devices. In certain embodiments, the image servers 120 can be configured to generate the container images 124 as virtual hard disks ("VHDs") or according to other suitable disk image file formats for storing contents of a corresponding container. In other embodiments, the image servers 120 can be configured to generate the container images 124 as a file folder, a directory, a compressed file, and/or other suitable types of software packages. As shown in FIG. 1, upon receiving a request from the host 102, the image servers 120 can be configured to provide a copy of a requested container image 124 to the host 102 via the computer network 104. As described in more detail below, the provided container image 124 can include one or more symbolic links to effect deferred path resolution to the certain files 107 in the host storage 104 on the host 102.

The host 100 can be a server, a desktop or laptop computer, a smart phone, or other suitable types of computing device. As shown in FIG. 1, the host 102 can include a host operating system 103 having a container engine 105 and a file manager 106 interconnected to a host storage 104 containing files 107 organized by a host filesystem 108 and a path table 110 having entries each containing a parent identifier and a corresponding drive and/or directory in the host filesystem 108 on the host 102. Though particular components of the host operating system 103 are shown in FIG. 1, in other embodiments, the host operating system 103 can also include device drivers, event logs, temporary files, utility applications, and/or other suitable software components.

The host storage 104 can include any suitable computer readable storage device configured to contain digital data. Example host storage 104 can include hardware/software components such as hard disk drives, solid state drives, and associated file systems. In the illustrated embodiment, the path table 110 is shown as being stored in the host storage 104. In other embodiments, the path table 110 can also be stored on a removable storage device (e.g., a flash drive), a remote server (not shown), or other suitable locations accessible by the file manager 106 via the computer network 104 such as the Internet. In certain embodiments, the path table 110 can be included with the host operating system 103 when being installed on the host 102. In other embodiments, the path table 110 can be downloaded from, for instance, the image servers 120 or other suitable sources on an ad hoc, or other suitable basis. In any of the foregoing embodiments, the path table 110 can also be updated periodically, based on an event (e.g., updating a container image), or in other suitable manners from the image servers 120 or other suitable sources, as an independent data package or a portion of an update to the hosting operating system 103, the containers 114, or other suitable components on the host 102.

Also shown in FIG. 1, the host operating system 103 can be configured to support one or more guest operating systems such as containers 114 (shown as first and second containers 114a and 114b, respectively) individually executing one or more applications 116 (shown as first and second application 116a and 116b, respectively). In other embodiments, the host operating system 103 can also include virtual switches (not shown), virtual routers (not shown), or other suitable virtual components configured to facilitate operations of the containers 114 and/or corresponding applications 116. The first and second containers 114a and 114b each executing one application 116a and 116b are shown in FIG. 1 for illustration purposes. In other embodiments, the host operating system 103 can support three, four, or any other suitable numbers of containers 114 each executing suitable numbers of applications 116.

As shown in FIG. 1, a security boundary 112 isolates the containers 114 from the host operating system 103. The security boundary 112 can be implemented as a set of rules (not shown) in the host operating system 103 to limit or prevent the containers 114 and/or the corresponding applications 116 to access certain hardware/software resources in the host operating system 103. For example, the security boundary 112 can limit or prevent the guest operating system 114 from accessing compute, storage, network, or other suitable types of resources available to the host operating system 103.

The container engine 105 can be configured to manage deployment and execution of the containers 114. For example, the container engine 105 can be configured to collect container metrics, starting, suspending, stopping the containers 114, managing resources available to the containers 114, facilitating execution of container commands, and other suitable operations. In accordance with embodiments of the disclosed technology, the container engine 105 can also be configured to deploy the containers 114 based on the container images 124 received from, for instance, the image servers 120. The container images 124 can include one or more symbolic links resolution of which can be deferred to runtime. As such, during deployment of the containers 114, compute, storage, network, and/or other suitable types of resources at the host 102 can be reduced when compared to dynamically generating all files of the container images 124. Example operations of deploying a container in accordance with embodiments of the disclosed technology are described below with reference to FIGS. 2A and 2B.

The file manager 106 can be configured to provide a user interface to manage files 107 and folders (not shown) on the host storage 104. In certain embodiments, the file manager 106 can include one or more filesystem filters 115 (only one is shown in FIG. 1 for illustration purposes). The filesystem filters 115 can be individually configured to perform certain file system functions in order to accommodate data storage in the host storage 104. Example functionalities can include creating time stamps, creating last change time stamps, etc. In accordance with embodiments of the disclosed technology, a filesystem filter 115 can be configured to resolve symbolic links included in the container images 124 during runtime. As such, the file manager 106 can be configured to locate and serve requested files 107 for the containers 114, as described in more detail below with reference to FIGS. 3A and 3B.

Figure 2A:
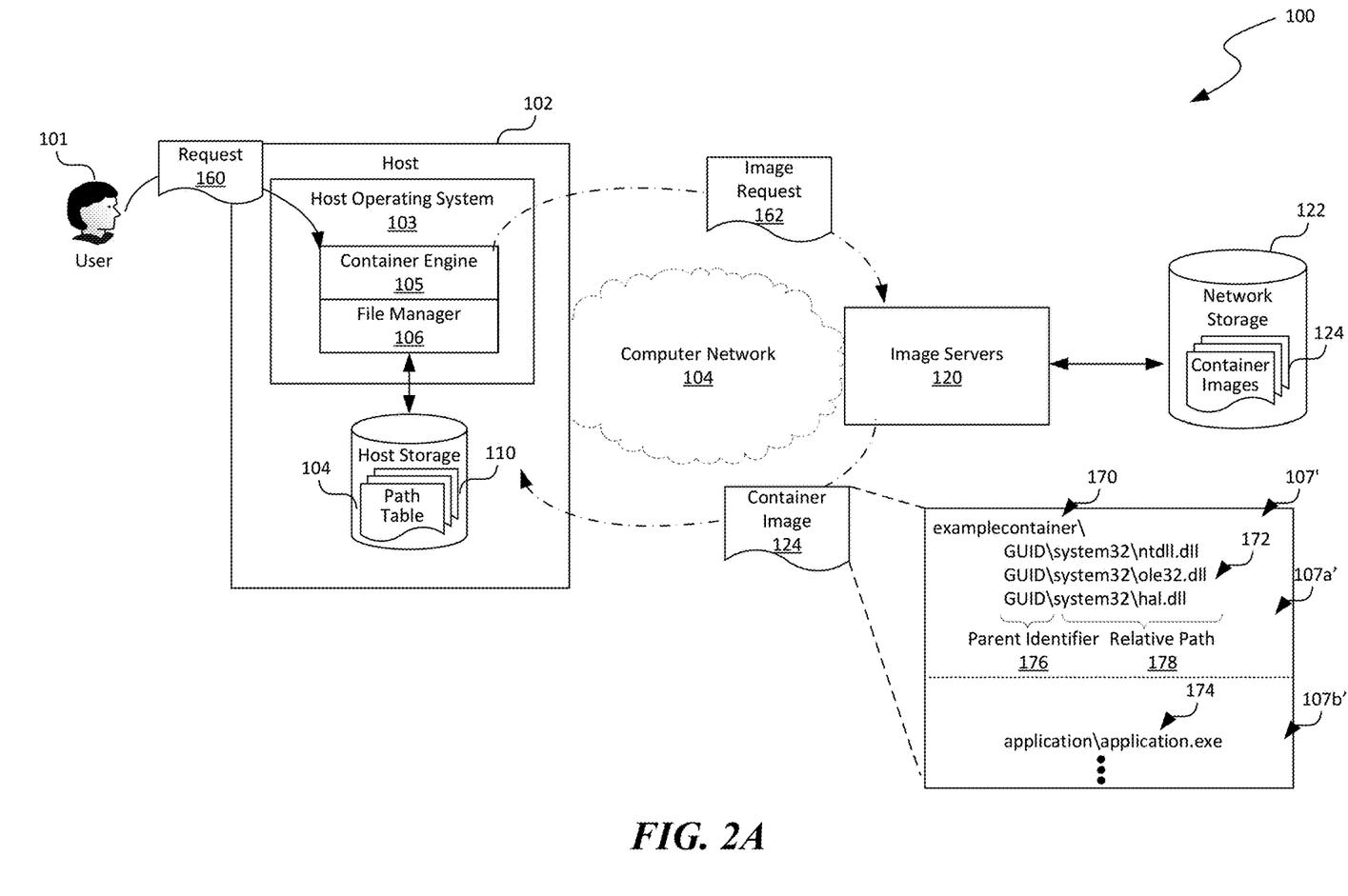
FIGS. 2A and 2B are schematic diagrams illustrating certain hardware/software components of a host in the computing system of FIG. 1 during certain stages of deploying a container image in accordance with embodiments of the disclosed technology.
Figure 2B:
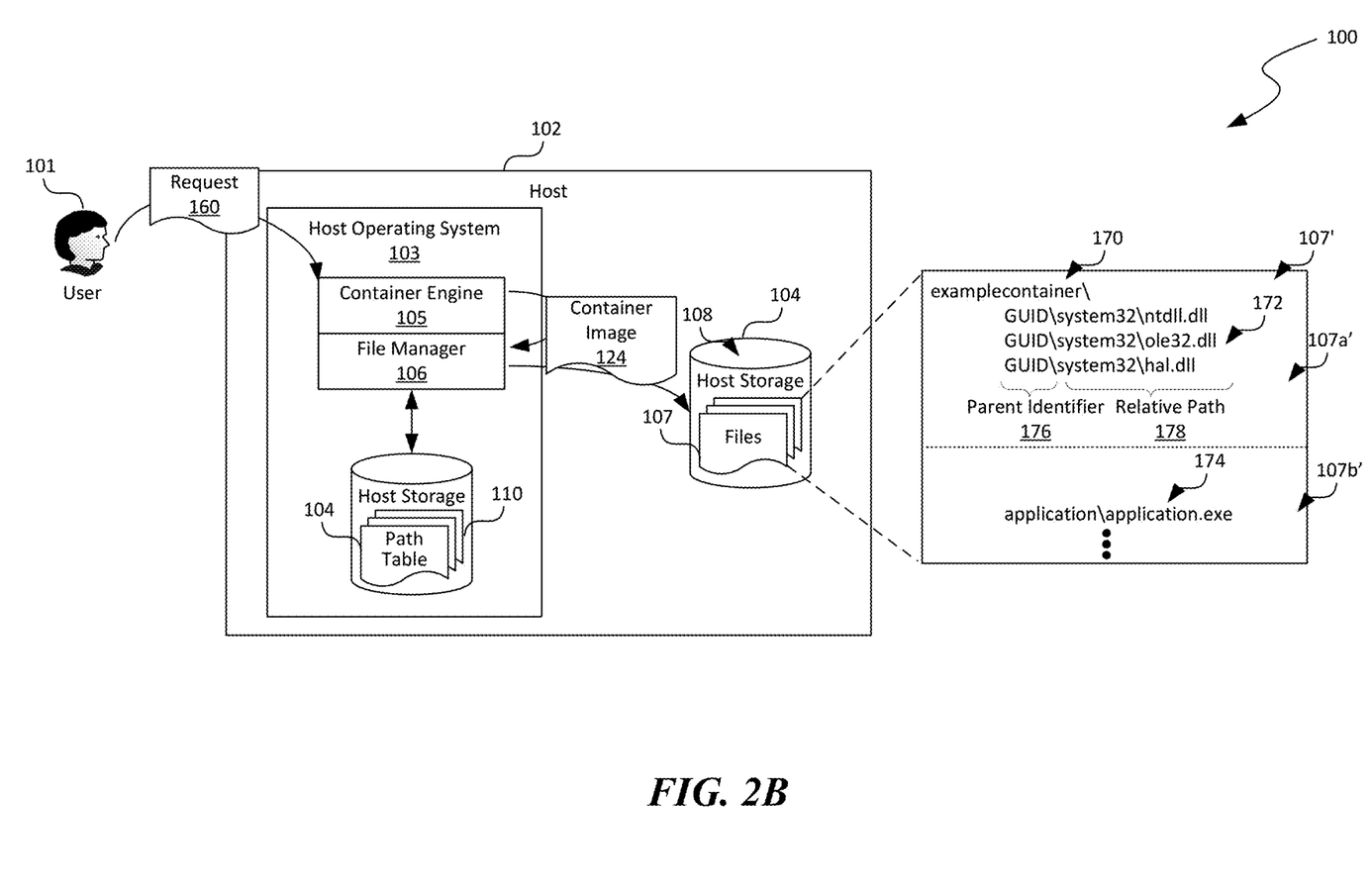

FIGS. 2A and 2B are schematic diagrams illustrating certain hardware/software components of the host 102 in the computing system 100 of FIG. 1 during certain stages of deploying a container image in accordance with embodiments of the disclosed technology. In FIGS. 2A and 2B and in other figures herein, certain components of the computing system 100 are omitted for clarity.

As shown in FIG. 2A, a user 101 can provide a request 160 to the container engine 105 for deploying a container 114 (FIG. 1) on the host 102. In response to receiving the request 160 from the user 101, the container engine 105 can transmit an image request 162 to the image servers 120 via the computer network 104. In response, the image servers 120 can retrieve a suitable container image 124 and transmit the located container image 124 to the host 102. In some embodiments, the request 160 can be automatically generated, for example, being triggered by an event to deploy a container 114. In other embodiments in which a container 114 is already deployed, the request 160 may be triggered based on a timer event, a notification from the image servers 120, or some other mechanisms indicating that a suitable container image 124 is available.

The container image 124 can be organized in many suitable ways. For example, as shown in FIG. 2A, the container image 124 can be configured as a VHD having a file folder 170 (i.e., "examplecontainer\") with multiple files 107' in the file folder 170. The files 107' can include a first subset of files 107a' identified individually by a symbolic link 172, and a second subset of files 107b' identified individually by a hard link 174. The hard links 174 can identify files 107b' that are unique to the container 114. In the illustrated example, a hard link 174 identifies an application executable file "application.exe" under directory "application\." In other embodiments, the hard links 174 can also identify event logs, temporary files, or other suitable files 107' of the container 114.

In the illustrated embodiment, the symbolic links 172 each include a parent identifier 176 and a relative path 178, for instance, "GUID\system32\ntdll.dll." In the example shown in FIG. 2A, the parent identifier 176 includes a globally unique identifier (i.e., "GUID") that corresponds to a drive or directory on the host 102. In other examples, the parent identifier 176 can be an alphanumerical string, an integer number, or other suitable identification that corresponds to a drive or directory on the host 102. Even though the symbolic links 172 shown in FIG. 2A all have the same parent identifier 176 (i.e., "GUID"), in certain implementations, at least one of the symbolic links 172 can have a parent identifier 176 that is different than other symbolic links 172. By using different parent identifiers 176, a container image 124 can be structured according to a layered architecture to facilitate flexible development and update of the container images 124, as described in more detail below with reference to FIGS. 4A-4C.

As shown in FIG. 2B, upon receiving the container image 124, the container engine 105 can be configured to deploy the container 114 facilitated by the file manager 106. For example, in one embodiment, the container image 124 can be configured as a VHD, and the file manger 106 can mount the VHD of the container image 124 to the host 102 as a new drive (e.g., "D:\"). As such, the host filesystem 108 can recognize the container image 124 as a folder (i.e., "examplecontainer\") on the new drive (i.e., "D:\"). In other embodiments, the file manager 106 can also be configured to create a new folder on a different drive (e.g., "C:\") of the host 102 and copy and/or otherwise making available the files 107' from the container image 124. As described in more detail below with reference to FIGS. 3A and 3B, the symbolic links 172 can be resolved by the file manager 106 during runtime, and thus deferred from time of container deployment.

Figure 3A:
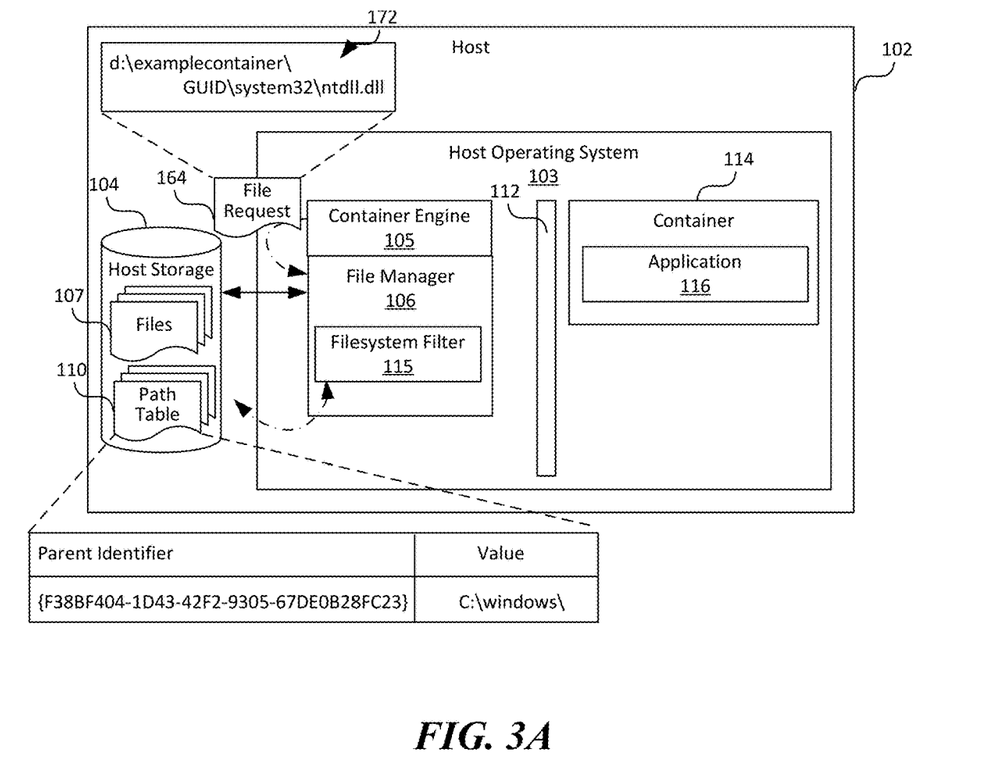
FIGS. 3A and 3B are schematic diagrams illustrating certain hardware/software components of a host in the computing system of FIG. 1 during certain stages of performing path resolution during runtime in accordance with embodiments of the disclosed technology.
Figure 3B:
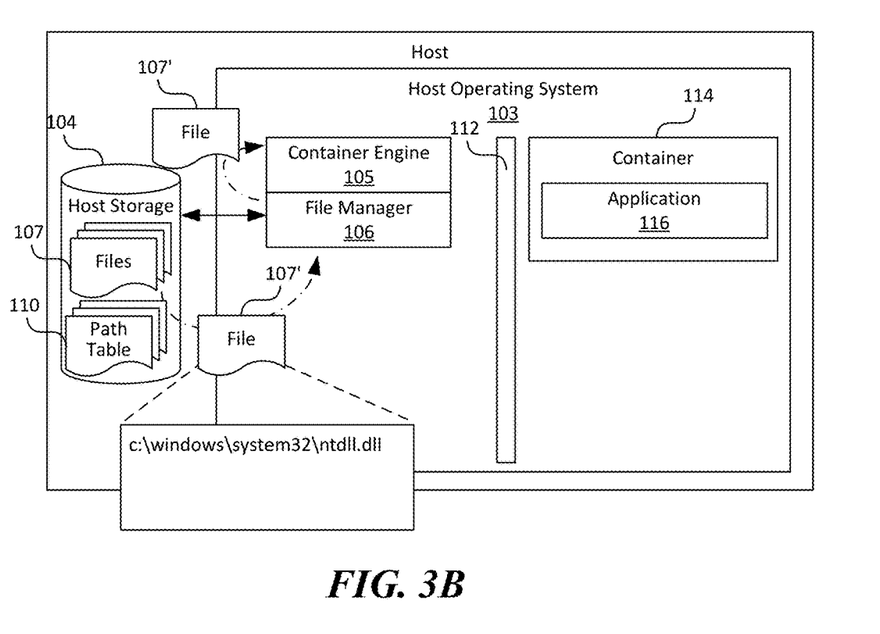

FIGS. 3A and 3B are schematic diagrams illustrating certain hardware/software components of the host 102 in the computing system 100 of FIG. 1 during certain stages of performing path resolution during runtime in accordance with embodiments of the disclosed technology. As shown in FIG. 3A, during runtime, the container engine 105 can initiate a container process for executing the application 116 in the container 114. During execution, the container process can transmit, via the container engine 105, a file request 164 for a file 107' contained in the container image 124 (FIG. 2B). In the illustrated example, the requested file 107' is identified by symbolic link 172 "D:\examplecontainer\GUID\system32\ntdll.dll."

Upon receiving the file request 164, the filesystem filter 115 can be configured to determine whether a path of the file 107' included in the container image 124 contains a symbolic link 172 or a hard link 174. In the example above, the path "D:\examplecontainer\GUID\system32\ntdll.dll" is a symbolic link 172 in which the GUID can be {F38BF404-1D43-42F2-9305-67DE0B28FC23}. In response to determining that the path of the file 107' contains a symbolic link 172, the filesystem filter 115 can be configured to resolve the parent identifier 176 of the symbolic link 172 to obtain a parent path by consulting the path table 110 on the host 102. As shown in FIG. 3A, the path table 110 contains an entry having a parent identifier (e.g., {F38BF404-1D43-42F2-9305-67DE0B28FC23}) that corresponds to a parent path "C:\windows\"). As such, the filesystem filter 115 can be configured to replace the parent identifier 176 with the parent path and concatenate the relative path to the obtained parent path to obtain a full path corresponding to the file 107', for example, "C:\windows\system32\ntdll.dll." The filesystem filter 115 (or other suitable components of the file manager 106) can then retrieve, from the storage device 104, a copy of the file 107' according to the obtained full path of the file 107' and serving the retrieved copy of the file 107' to the container process, as shown in FIG. 3B.

Several embodiments of the disclosed technology can thus reduce or even prevent overloading compute, storage, network, or other suitable types of resources at the host 102 during deployment of the container 114. Without being bound by theory, it has been recognized that even though a container image 124 can include thousands of files, only a small portion of these files 107' are accessed at one time during runtime. In other words, not all or even a majority of the files 107' are needed concurrently during runtime. As such, by deferring path resolution of these files 107', i.e., not resolving the symbolic links 172 of the files 107' during deployment, significant amount of resources for resolving these symbolic links 172 at the host 102 can be saved. In addition, by not resolving the symbolic links 172 during deployment, an amount of time for instantiation of the container 114 can also be reduced when compared to copying or establishing hard links to the files 107' during deployment according to a recipe file.

Figure 4A:
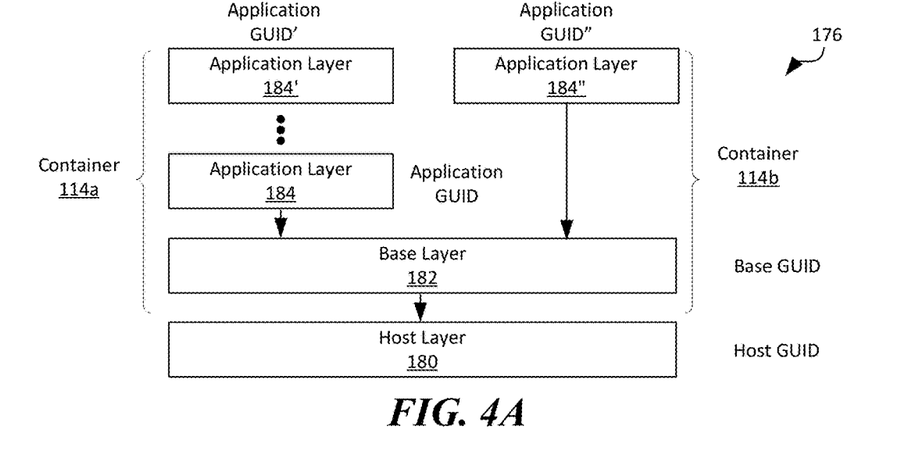
FIGS. 4A-4C are schematic diagrams illustrating certain layered architecture of container images in accordance with additional embodiments of the disclosed technology.

In accordance with additional embodiments of the disclosed technology, a container image 124 can also be logically divided into separate container layers using symbolic links, and thus allowing individual container layers to be deployed and/or updated separately. For instance, as shown in FIG. 4A, a first container 114a can include a base layer 182 having files configured to provide filesystem facilities, and application layers 184 and 184' on top of the base layer 182. A second container 114b can include another application layer 184" on top of the same base layer 182.

Each of the base layer 182 and the application layers 184 can have a corresponding parent identifier 176 (e.g., a base GUID and application GUID, respectively). Such parent identifiers 176 of the container layers can be hard coded into the host operating system 103 (FIG. 1), included as a part of container layer metadata, or disseminated in other suitable manners. As such, the base layer 182 can be deployed on the host 102 (FIG. 1) with symbolic links 172 (FIG. 2A) that reference the parent identifier 176 of the host 102 (e.g., a host GUID). Subsequently, the application layers 184, 184', and 184" can be deployed on the same host 102 with symbolic links 172 that reference one or more of the host GUID, the base GUID, or application GUID. The host, base, and application GUIDs can be resolved during runtime as described above with reference to FIGS. 3A and 3B.

Figure 4B:
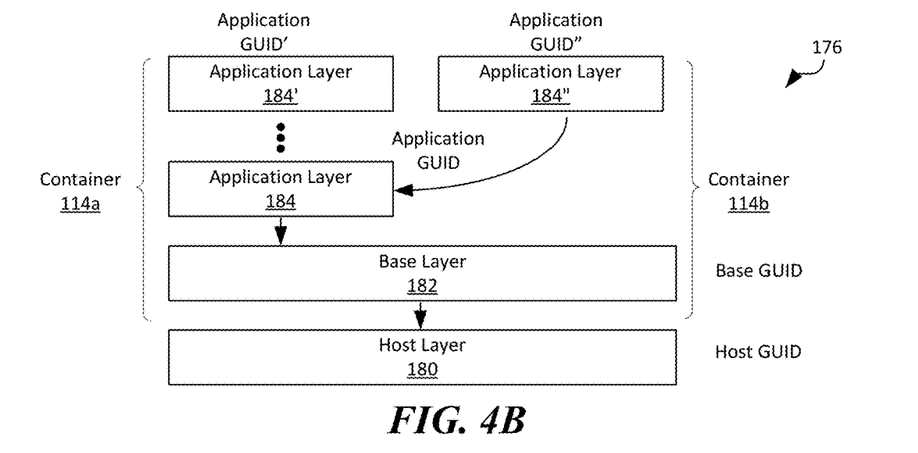

The foregoing layered architecture of the container images 124 can further reduce sizes of deployed containers 114 on the host 102. For instance, as shown in FIG. 4B, the second container 114b having the application layer 184" can be deployed on the same host 102 with symbolic links 172 referencing the deployed application layer 184 of the first container 114a. As such, the image of the second container 114b does not need to include files/directories of the base layer 182 or the application layer 184. As such, rigid interdependencies of base and application layers in conventional container packages can be avoided. Thus, the host 102 can have a single copy of the base and/or application layers in order to serve multiple containers 114 referencing the base and/or application layers.

Figure 4C:
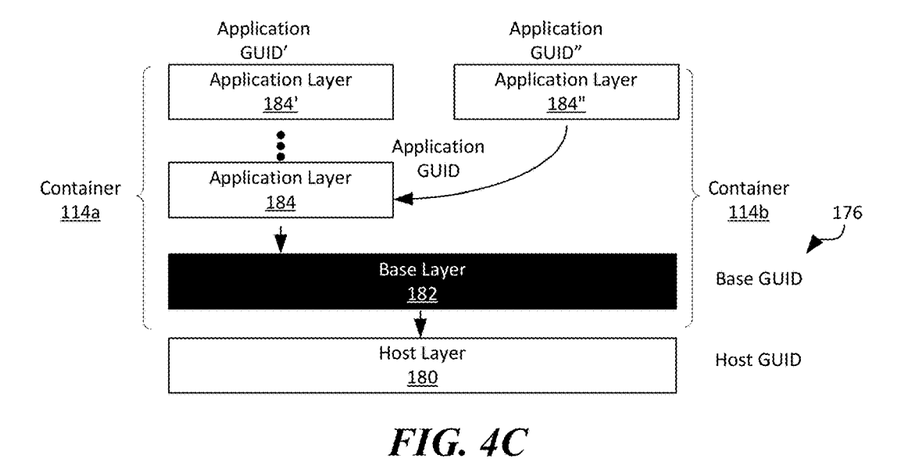

The foregoing layered architecture can also allow efficient updating of the deployed containers 114 on the host 102. For example, as shown in FIG. 4C, when an update to the base layer 180 is available, the host 102 can update a single copy of the base layer 180 (shown in reverse contrast) without updating any application layers 184 in each of the containers 114. During runtime, symbolic links 172 to the base layer 182 can be resolved using the same base GUID as the original version of the base layer 182. In another example, when an update to the application layer 184 is available, the host device can update the application layer 184 without affecting the base layer 180 or other application layers 184' and 184". Such update can sometimes be implemented as hot patches during which execution of the containers 114 is not suspended or terminated.

Figure 5A:
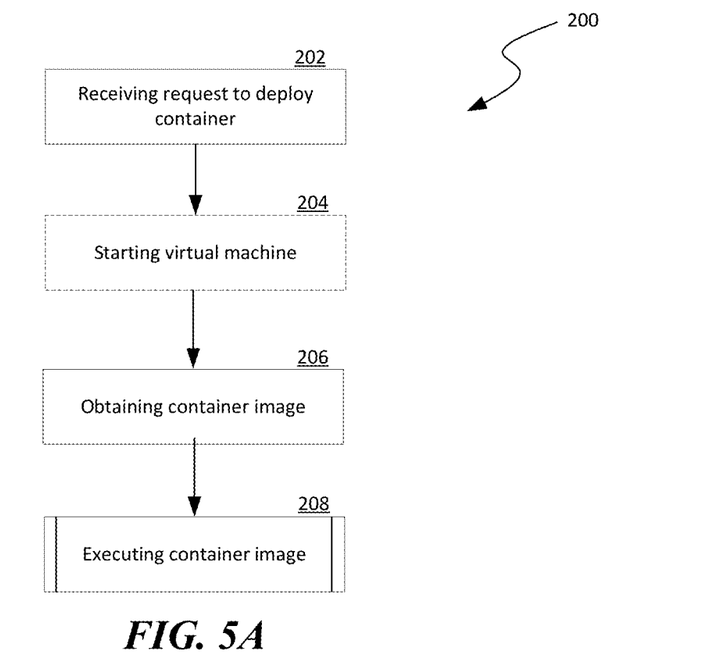
FIGS. 5A-5C are flowcharts illustrating various processes of deferred path resolution for deploying containers in accordance with embodiments of the disclosed technology.
Figure 5B:
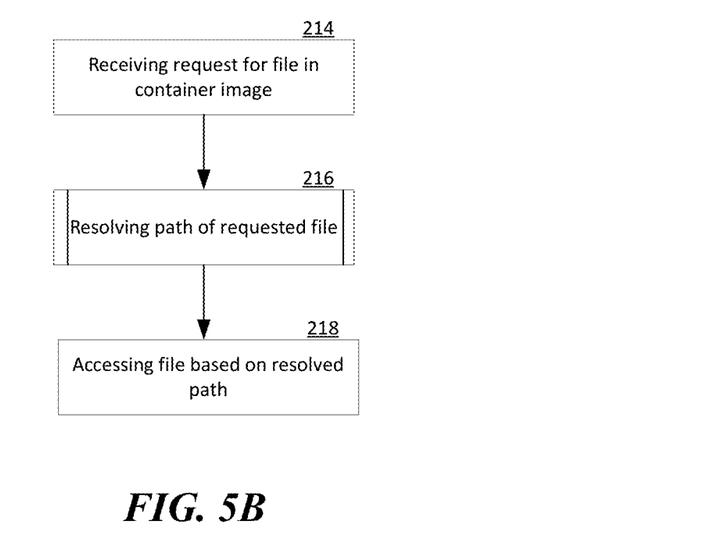
Figure 5C:
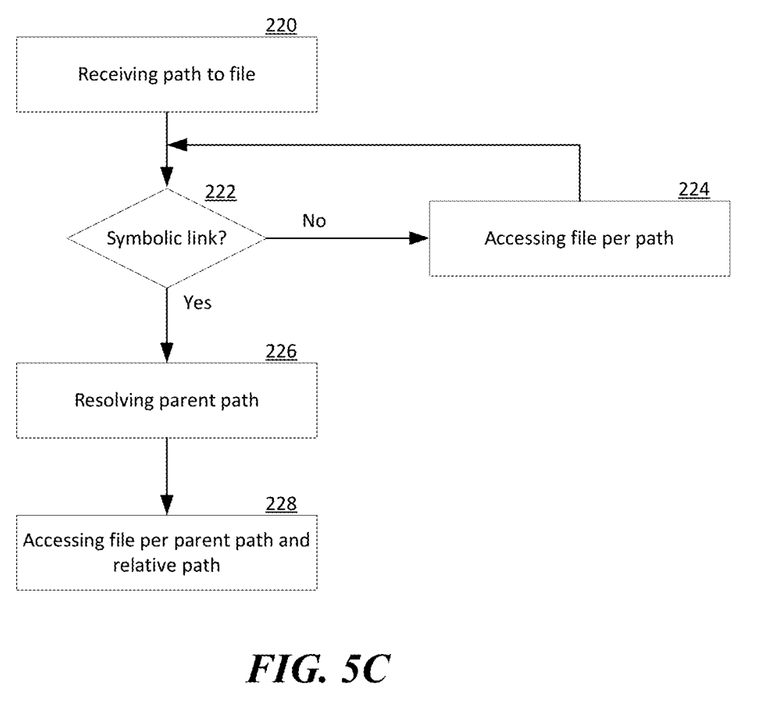

FIGS. 5A-5C are flowcharts illustrating various processes of deferred path resolution for deploying containers in accordance with embodiments of the disclosed technology. Even though the processes are described below with reference to the computing system 100 of FIG. 1, in other embodiments, the processes can be implemented in computing systems with additional and/or different components.

As shown in FIG. 5A, a process 200 can include receiving a request to deploy a container at stage 202. In response to receiving the request, in certain embodiments, the process 200 can include optionally starting a virtual machine on a host 102 (FIG. 1) for hosting the container at stage 204. In other embodiments, the operation at stage 204 can be omitted. The process 200 can then include obtaining a container image at stage 212. In one example, the container image can be obtained from an image server 120 (FIG. 1). In other examples, the container image can be obtained via removable storage devices or other suitable sources. As described above with reference to FIGS. 2A and 2B, the obtained container image can include one or more symbolic links that are not resolved until runtime. The process 200 can further include executing the container image during runtime at stage 208. Example operations of executing the container image are described in more detail below with reference to FIG. 5B.

As shown in FIG. 5B, example operations of executing the container image can include receiving a request for a file in the container image at stage 214. In response to receiving the request, the operations include resolving a path of the requested file at stage 216. Example operations of resolving the path are described in more detail below with reference to FIG. 5C. The operations can then include accessing the file from the host 102 (FIG. 1) according to the resolved path at stage 218.

As shown in FIG. 5C, example operations for resolving the path can include receiving a path to the file at stage 220. The operations can then include a decision stage 222 to determine whether the received path is identified by a symbolic link. In response to determining that the path is not identified by a symbolic link, the operations can include accessing the file according to the received path at stage 224. In response to determining that the path is identified by a symbolic link, the operations can include resolving the symbolic link by identifying a parent path at stage 226. The operations can then include accessing the file from the host 102 by concatenating the identified parent path and the relative path of the symbolic link, as described in more detail above with reference to FIGS. 3A and 3B.

Figure 6:
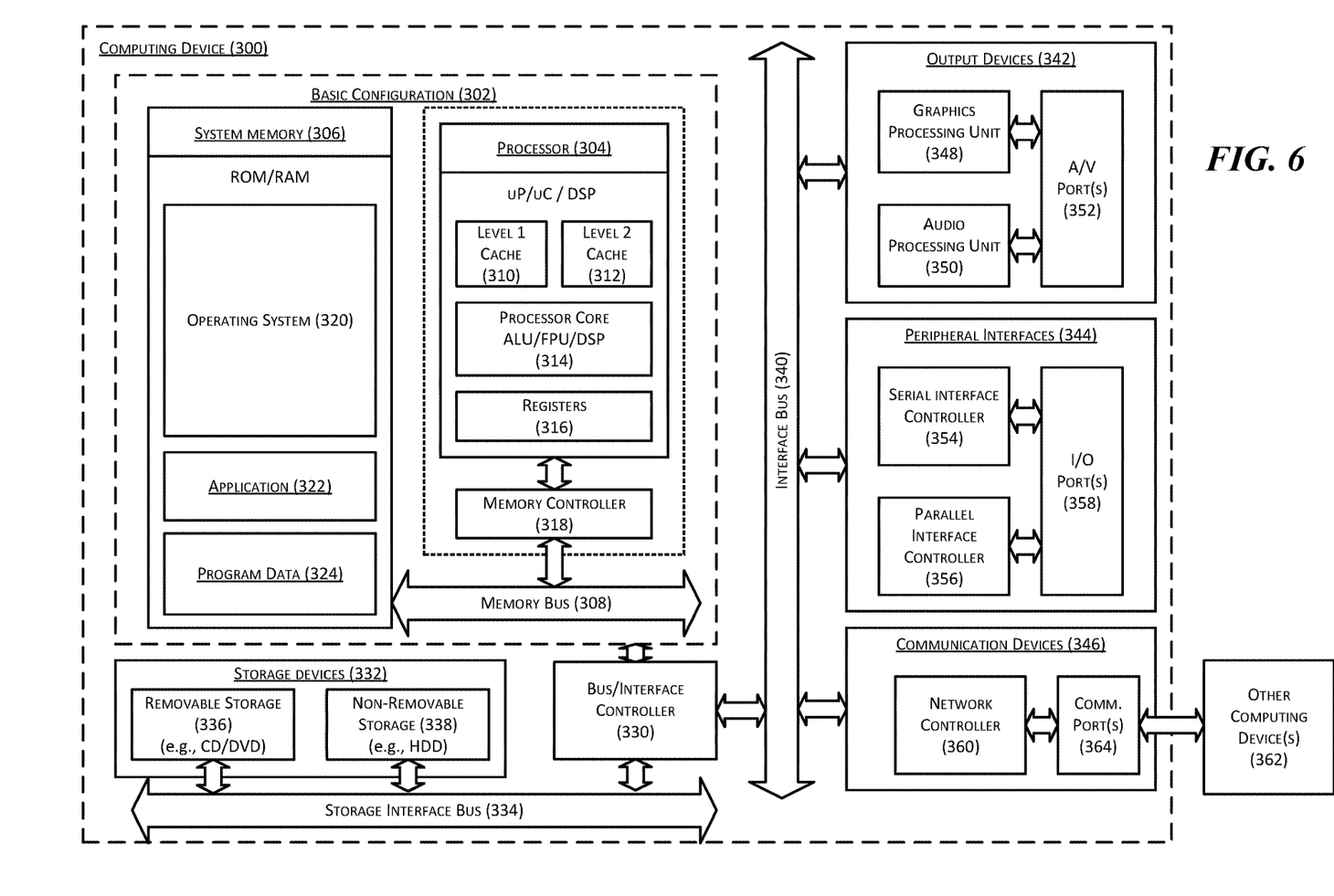
FIG. 6 is a computing device suitable for certain components of the computing system in FIG. 1.

FIG. 6 is a computing device 300 suitable for certain components of the computing system 100 in FIG. 1. For example, the computing device 300 can be suitable for the host 102 or the image servers 120 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, NVRAM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other devices 362 over a network communication link via one or more communication ports 364. Note that in some embodiments, the other devices 362 may include a data center and/or other suitable facilities configured to provide "cloud" services. The other devices 362 may abstract resources and functions, and thus enabling a distributed computing between the computing device 300 and the other device 362.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless webwatch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed in a computing device having a processor, a storage device, and a memory containing instructions executable by the processor to provide a host filesystem, the method comprising:
receiving, at the computing device, a container image corresponding to a container to be instantiated at the computing device to execute a container process, the container image including a first set of files identified by symbolic links individually directed to a file in the host filesystem on the computing device and a second set of files identified by hard links to files in the host filesystem;
in response to receiving the container image, at the computing device, instantiating the container by:
storing the first set of files in the container image in a folder of the host filesystem on the computing device without resolving the symbolic links until runtime of the container; and
establishing the hard links corresponding to the second set of files in the container image; and
during execution of the container process in the container after instantiating the container:
receiving, at the host filesystem, a first file request from the container process for a first file included in the first set of files of the container image of the container;
in response to receiving the first file request for the first file, at the host filesystem, determining whether a path of the first file included in the container image contains a symbolic link having a parent identifier and a first relative path;
in response to determining that the path of the first file contains the symbolic link:
consulting a table accessible by the host filesystem on the computing device, the table storing a unique identifier for the parent identifier and a corresponding parent path as entries, the unique identifier identifying the parent path;
resolving the parent identifier by using the unique identifier to obtain the parent path;
concatenating the first relative path to the parent path to obtain a full path corresponding to the first file;
retrieving, from the storage device, a copy of the first file according to the full path; and
serving the copy of the first file to the container process; and
receiving, at the host filesystem, a second file request from the container process for a second file included in the container image, the second file being identified by the parent identifier and a second relative path that is different from the first relative path.

2. The method of claim 1 wherein:
the parent identifier includes a globally unique identification string; and
resolving the parent identifier includes identifying a corresponding file directory on the computing device by consulting the table accessible by the host filesystem.

3. The method of claim 1, further comprising in response to determining that the path of the first file does not contain a symbolic link, locating a copy of the first file from the container image on the computing device and serving the copy of the first file to the container process.

4. The method of claim 1 wherein:
the container image is stored on the computing device in a folder of the host filesystem; and
the method further includes, in response to determining that the path of the first file does not contain a symbolic link, locating a copy of the first file from the folder containing the container image and serving the retrieved copy of the first file to the container process.

5. The method of claim 1 wherein:
the container image is stored on the computing device in a folder of the host filesystem, the folder having multiple files.

6. The method of claim 1 wherein:
the container image is stored on the computing device in a folder of the host filesystem, the folder having multiple files including the first file identified by the symbolic link and other files identified by additional symbolic links; and
the method further includes not resolving any of the additional symbolic links to the other files until another file request from the container process for another one of the other files is received.

7. The method of claim 1 wherein:
the parent identifier is a first parent identifier;
the method further includes receiving, at the host filesystem, a third file request from the container process for a third file included in the container image, the third file being identified by the parent identifier and a third relative path; and
the third relative path is different from the first relative path.

8. The method of claim 1 wherein:
the parent identifier is a first parent identifier;
the method further includes receiving, at the host filesystem, a third file request from the container process for a third file included in the container image, the third file being identified by the parent identifier and a third relative path; and
the third relative path is not different from the first relative path.

9. The method of claim 1 wherein:
the parent identifier is a first parent identifier;
the method further includes receiving, at the host filesystem, a third file request from the container process for a third file included in the container image, the third file being identified by a second parent identifier and a third relative path; and
the second parent identifier is different than the first parent identifier while the third relative path is the same as the first relative path.

10. A computing device, comprising:
a processor;
a storage device; and
a memory containing instructions executable by the processor to provide a host filesystem and to cause the computing device to:

receive, at the computing device, a container image corresponding to a container to be instantiated at the computing device to execute a container process, the container image including a first set of files identified by symbolic links individually directed to a file in the host filesystem on the computing device and a second set of files identified by hard links to files in the host filesystem;

in response to receiving the container image, at the computing device, instantiating the container, wherein instantiating the container causes the computing device to:

store the first set of files in the container image in a folder of the host filesystem on the computing device without resolving the symbolic links until runtime of the container; and establish the hard links corresponding to the second set of files; and during execution of the container process in the container after instantiating the container:

upon receiving, at the host filesystem, a first file request from the container process for a first file included in the first set of files of the container image:

determine whether a path of the first file included in the container image contains a symbolic link having a parent identifier and a first relative path;

in response to determining that the path of the first file contains the symbolic link:

consulting a table accessible by the host filesystem on the computing device, the table storing a unique identifier for the parent identifier and a corresponding parent path as entries, the unique identifier identifying the parent path;

resolve the parent identifier by using the unique identifier to obtain the parent path;

concatenate the first relative path to the parent path to obtain a full path corresponding to the first file; and retrieve, from the storage device, a copy of the first file according to the full path; and serve the copy of the first file to the container process; and receiving, at the host filesystem, a second file request from the container process for a second file included in the container image, the second file being identified by the parent identifier and a second relative path that is different from the first relative path.

11. The computing device of claim 10 wherein:
the parent identifier includes a globally unique identification string; and
to resolve the parent identifier includes to identify a corresponding file directory on the computing device by consulting the table accessible by the host filesystem.

12. The computing device of claim 10 wherein the instructions are also executable by the processor to cause the computing device to locate a copy of the first file from the container image on the computing device and serving the copy of the first file to the container process in response to determining that the path of the first file does not contain a symbolic link.

13. The computing device of claim 10 wherein:
the container image is stored on the computing device in a folder of the host filesystem; and the instructions are also executable by the processor to cause the computing device to, in response to determining that the path of the first file does not contain a symbolic link, locate a copy of the first file from the folder containing the container image and serving the copy of the first file to the container process.

14. The computing device of claim 10 wherein:
the container image is stored on the computing device in a folder of the host filesystem, the folder having multiple files.

15. The computing device of claim 10 wherein:
the container image is stored on the computing device in a folder of the host filesystem, the folder having multiple files including the first file identified by the symbolic link and other files identified by additional symbolic links; and the instructions are also executable by the processor to cause the computing device to not resolve any of the additional symbolic links to the other files until another file request from the container process for another one of the other files is received.

16. A method performed in a computing device having a processor, a storage device, and a memory containing instructions executable by the processor to provide a host filesystem, the method comprising:

receiving a request to deploy a container on the computing device;

receiving, at the computing device, a container image corresponding to the container, the container image including a first set of files identified by symbolic links individually directed to a file in the host filesystem on the computing device and a second set of files identified by hard links;

storing the first set of files of the container image in a folder of the host filesystem on the computing device without resolving the symbolic links of the first set of the files until runtime of the container and establishing the hard links corresponding to the second set of files; and during execution of a container process of the container;

receiving, at the host filesystem, a first file request from the container process for a first file included in the first set of files of the container image of the container;

determining whether a path of the first file included in the container image contains a symbolic link having a parent identifier and a first relative path;

in response to determining that the path of the first file contains the symbolic link:

consulting a table accessible by the host filesystem on the computing device, the table storing a unique identifier for the parent identifier and a corresponding parent path as entries, the unique identifier identifying the parent path;

resolving the parent identifier by using the unique identifier to obtain the parent path;

concatenating the first relative path to the parent path to obtain a full path corresponding to the first file;

retrieving, from the storage device, a copy of the first file according to the full path; and serving the copy of the first file to the container process; and receiving, at the host filesystem, a second file request from the container process for a second file included in the container image, the second file being identified by the parent identifier and a second relative path that is different from the first relative path.

17. The method of claim 16 wherein:

the symbolic links individually include a globally unique identification string and a relative path; and the method further includes, during runtime of the container:

resolving the globally unique identification string of one of the symbolic links to a drive or directory in the host filesystem of the computing device; and accessing a file in the host filesystem of the computing device according to the drive or directory and the relative path.

18. The method of claim 16 wherein:

the symbolic links individually include a globally unique identification string and a relative path; and the method further includes, during runtime of the container:

resolving the globally unique identification string of one of the symbolic links to a drive or directory in the host filesystem of the computing device;

concatenating the drive or directory with the relative path to obtain a full path; and accessing a file in the host filesystem of the computing device according to the full path.

19. The method of claim 16 wherein:

the container image is configured as a disk image; and storing the container image includes mounting the disk image onto the computing device.

20. The method of claim 16 wherein:

the symbolic links individually include a globally unique identification string and a relative path; and at least one of the symbolic links has globally unique identification string that is different than that of another one of the symbolic links.

\* \* \* \* \*